(12) United States Patent
Kim et al.

(10) Patent No.: US 8,104,037 B2
(45) Date of Patent: Jan. 24, 2012

(54) TERMINAL AND METHOD FOR PERFORMING DEVICE MANAGEMENT SCHEDULED BASED ON THRESHOLD

(75) Inventors: Te-Hyun Kim, Gyeonggi-Do (KR); Pablo Hernandez, Paris (FR)

(73) Assignee: LG Electronics Inc. (KR)

( * ) Notice: Subject to any disclaimer, the term of this patent is extended or adjusted under 35 U.S.C. 154(b) by 1271 days.

(21) Appl. No.: 11/655,841

(22) Filed: Jan. 22, 2007

(65) Prior Publication Data

US 2007/0174444 A1   Jul. 26, 2007

Related U.S. Application Data (60) Provisional application No. 60/760,942, filed on Jan. 23, 2006, provisional application No. 60/762,517, filed on Jan. 27, 2006.

(30) Foreign Application Priority Data

May 12, 2006   (KR) ........................ 10-2006-0043155
Jan. 18, 2007   (KR) ........................ 10-2007-0005822

(51) Int. Cl.
  *G06F 9/46* (2006.01)
  *G06F 15/16* (2006.01)
  *G06F 15/173* (2006.01)
  *H04W 24/00* (2009.01)

(52) U.S. Cl. ....................................................... 718/102

(58) Field of Classification Search .................. 718/102
  See application file for complete search history.

(56) References Cited

U.S. PATENT DOCUMENTS

| | | | |
|---|---|---|---|
| 5,063,523 A | 11/1991 | Vrenjak | |
| 6,125,388 A | 9/2000 | Reisman | |
| 6,175,832 B1 | 1/2001 | Luzzi et al. | |
| 6,263,358 B1 | 7/2001 | Lee et al. | |
| 6,426,959 B1 | 7/2002 | Jacobson et al. | |
| 6,480,972 B1 * | 11/2002 | Cromer et al. | 714/25 |
| 6,664,978 B1 | 12/2003 | Kekic et al. | |
| 6,757,897 B1 | 6/2004 | Shi et al. | |
| 6,950,864 B1 | 9/2005 | Tsuchiya | |
| 6,970,917 B1 * | 11/2005 | Kushwaha et al. | 709/217 |
| 6,978,302 B1 | 12/2005 | Chisholm et al. | |
| 7,493,407 B2 * | 2/2009 | Leedom et al. | 709/232 |
| 7,499,700 B2 * | 3/2009 | Dillon et al. | 455/423 |

(Continued)

FOREIGN PATENT DOCUMENTS

JP   2005-234736 A   9/2005

(Continued)

OTHER PUBLICATIONS

Li, "Agent-Based Mobile Multimedia Service Quality Monitoring", IFIP International Federation for Information Processing, 2004, pp. 189-199.*

*Primary Examiner* — Jennifer To
(74) *Attorney, Agent, or Firm* — Birch, Stewart, Kolasch & Birch, LLP (57) ABSTRACT

Commands for device management to be executed within a terminal and threshold-based conditions for executing such commands included within a scheduling context are provided to the terminal ahead of time. Therefore, the terminal can perform the commands for device management, before errors occurs within the terminal since a value of a particular management object reaches the threshold.

10 Claims, 7 Drawing Sheets

U.S. PATENT DOCUMENTS

| | | | |
|---|---|---|---|
| 7,523,155 B2 | 4/2009 | Hayes, Jr. | |
| 7,716,276 B1* | 5/2010 | Ren et al. | 709/203 |
| 7,739,368 B2* | 6/2010 | Kim | 709/223 |
| 7,752,296 B2 | 7/2010 | Kim | |
| 7,877,634 B2* | 1/2011 | Kawano | 714/26 |
| 7,949,730 B2* | 5/2011 | Rensin et al. | 709/219 |
| 2002/0152105 A1* | 10/2002 | Dan et al. | 705/8 |
| 2003/0187982 A1* | 10/2003 | Petit | 709/225 |
| 2003/0204640 A1* | 10/2003 | Sahinoja et al. | 709/311 |
| 2003/0236823 A1 | 12/2003 | Patzer et al. | |
| 2004/0030533 A1* | 2/2004 | Hirose et al. | 702/188 |
| 2005/0216222 A1 | 9/2005 | Inoue | |
| 2005/0289229 A1 | 12/2005 | Kim | |
| 2006/0015626 A1 | 1/2006 | Hallamaa et al. | |
| 2006/0041652 A1 | 2/2006 | Cowham | |
| 2006/0190608 A1 | 8/2006 | Sahinoja et al. | |
| 2006/0221848 A1* | 10/2006 | Lake | 370/252 |
| 2007/0011681 A1 | 1/2007 | Shu et al. | |
| 2007/0106770 A1 | 5/2007 | Alnas | |
| 2007/0168728 A1* | 7/2007 | Blouin et al. | 714/25 |
| 2007/0174716 A1* | 7/2007 | Erdtmann et al. | 714/39 |
| 2007/0265003 A1 | 11/2007 | Kezys et al. | |
| 2009/0013220 A1* | 1/2009 | Kawano | 714/49 |

FOREIGN PATENT DOCUMENTS

| | | |
|---|---|---|
| KR | 10-2005-0046932 A | 5/2005 |
| WO | WO-00/38033 A2 | 6/2000 |
| WO | WO-2006/006803 A1 | 1/2006 |

* cited by examiner

TERMINAL AND METHOD FOR PERFORMING DEVICE MANAGEMENT SCHEDULED BASED ON THRESHOLD

RELATED APPLICATION

The present disclosure relates to a subject matter contained in priority U.S. Provisional App. No. 60/760,942, filed on Jan. 23, 2006 and priority U.S. Provisional App. No. 60/762,517, filed on Jan. 27, 2006 and priority Korean Application No. 10-2006-0043155, filed on May 12, 2006, and priority Korean Application No. 10-2007-0005822, filed on Jan. 18, 2007 which are each herein expressly incorporated by reference in its entirety.

BACKGROUND

The present invention relates to a terminal and method for performing device management scheduled based on threshold thereof.

In general, device management (DM) technology relates to showing (or indicating), to a device management (DM) server (or other network entity), the resources of a device management (DM) client (i.e., a terminal or other user device) as management objects that exist on a device management (DM) tree (or other type of hierarchy structure or logical format that is used for device management), allowing access thereto, and letting the DM server easily manage the terminal.

In such DM technology, the DM server may instruct the terminal to process commands for device management, while the terminal being managed, after immediately performing the corresponding command, may report the results thereof to the DM server. Also, the DM server may request the terminal to change, update, delete or otherwise process a particular function for device management.

One aspect of the present invention is the recognition by the present inventors of the following drawbacks in the related art DM technology. Namely, in the related art, the terminal may request the DM server for DM commands only when a value of a particular management object exceeds over a threshold and then an error or malfunction occurs within the terminal. As such, the diagnostic procedures of the related art terminal become more expensive, and do not allow effective resolution of diagnostic problems because such problems cannot be anticipated or discovered before they occur.

Thus, in order to address the above drawbacks, the present invention provides a terminal that receives, from the server, the scheduling context including device management scheduled based on threshold and performs the device management procedures according to the threshold.

Also, the present invention provides a server that generates a scheduling context (or other type of scheduling information) that includes device management scheduled based on a threshold to allow more effective scheduling to be performed by the terminal.

DETAILED DESCRIPTION

The present invention provides a terminal with a first module (or other hardware, software, or a combination thereof) that samples a value of a specified management object in the terminal and compares the sampled value with a specified threshold; and a second module (or other hardware, software, or a combination thereof) that executes a device management command for the management object, if it is determined by the first module that the sampled value of the management object has reached the threshold.

The present invention also provides a terminal with a first module (or other hardware, software, or a combination thereof) that receives at least one or more scheduling contexts from a server, and installs the at least one or more scheduling contexts, wherein each scheduling context includes a command and a threshold-based condition to execute the command; a second module (or other hardware, software, or a combination thereof) that samples a value of a specified management object in the terminal and compares the sampled value with a specified threshold; and a third module (or other hardware, software, or a combination thereof) that executes a device management command for the management object, if it is determined by the first module that the sampled value of the management object has reached the threshold.

The present invention also provides a server comprising a DM scheduling enabler which creates at least one or more scheduling contexts and requests an installation of the at least one or more scheduling contexts to a terminal so that the terminal can perform device management according to the at least one or more scheduling contexts, wherein each scheduling context includes a command and a threshold-based condition to execute the command.

The present invention also provides a method for managing a device, comprising sampling a value of a specified management object; comparing the sampled value with a specified threshold; and executing a device management command for the management object, if it is determined that the value of the management object has reached the threshold.

Hereafter, exemplary embodiments of the present invention will be described in more detail with reference to the attached drawings. It can be clearly understood that these embodiments are merely exemplary and are not meant to limit the present invention.

Figure 1:
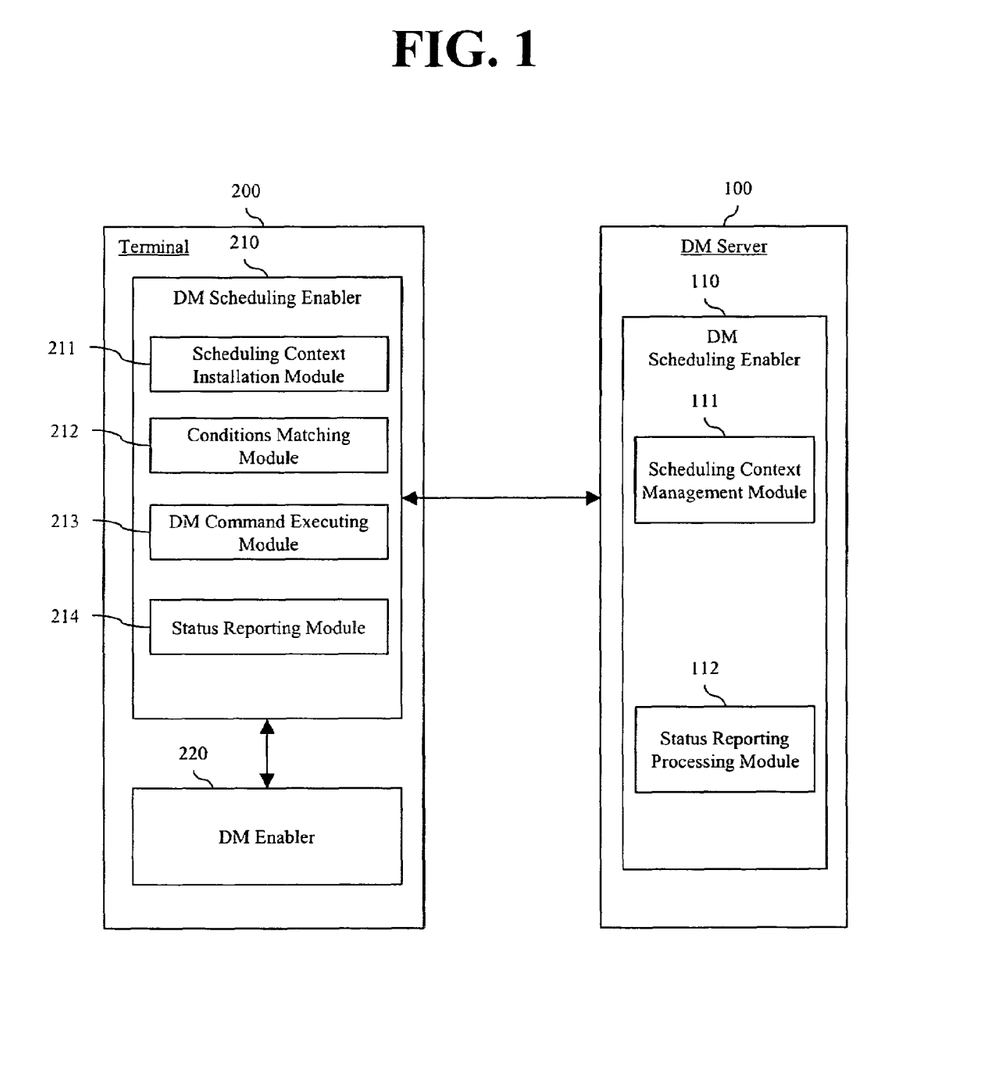
FIG. 1 shows exemplary conceptual structures of a server and a terminal according to the present invention.
Figure 2:
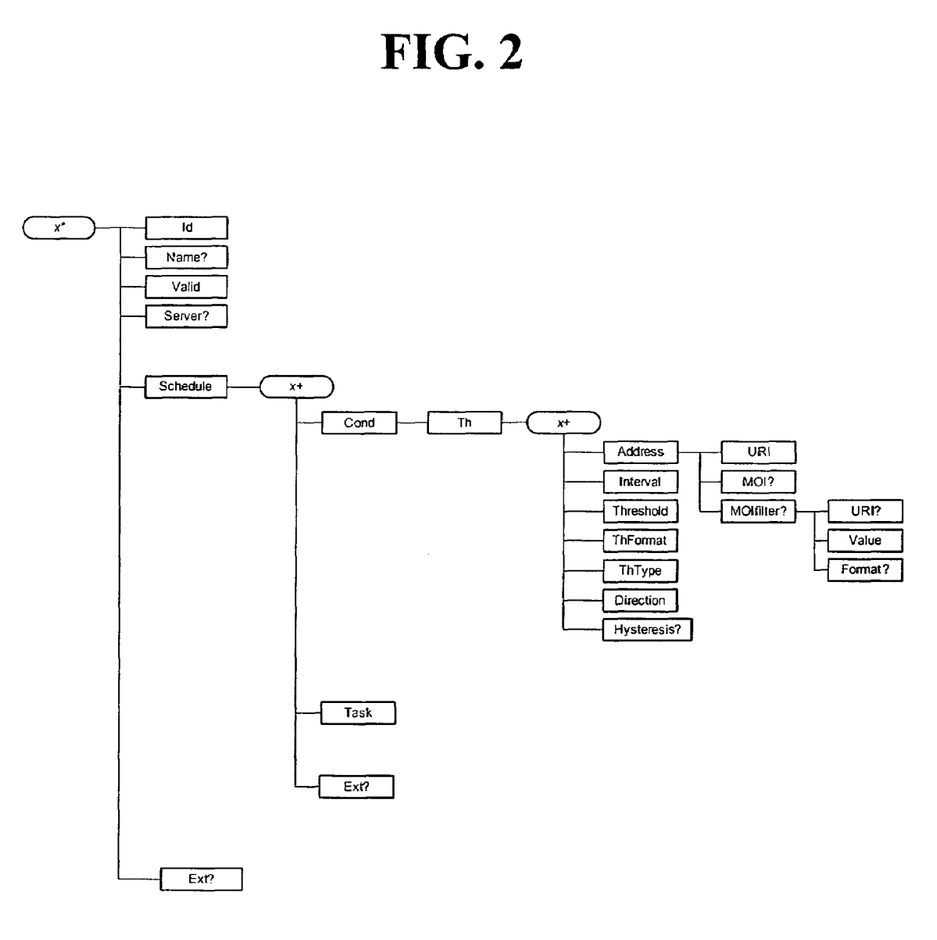
FIG. 2 shows the scheduling context as an exemplary device management tree structure according to the present invention.

FIG. 1 shows exemplary conceptual structures of a server (i.e., a DM server) and a terminal (i.e., a DM client) according to the present invention, while FIG. 2 shows the scheduling context as an exemplary device management tree structure. Also, FIG. 3 shows the scheduling context as an another exemplary device management tree structure.

Figure 3:
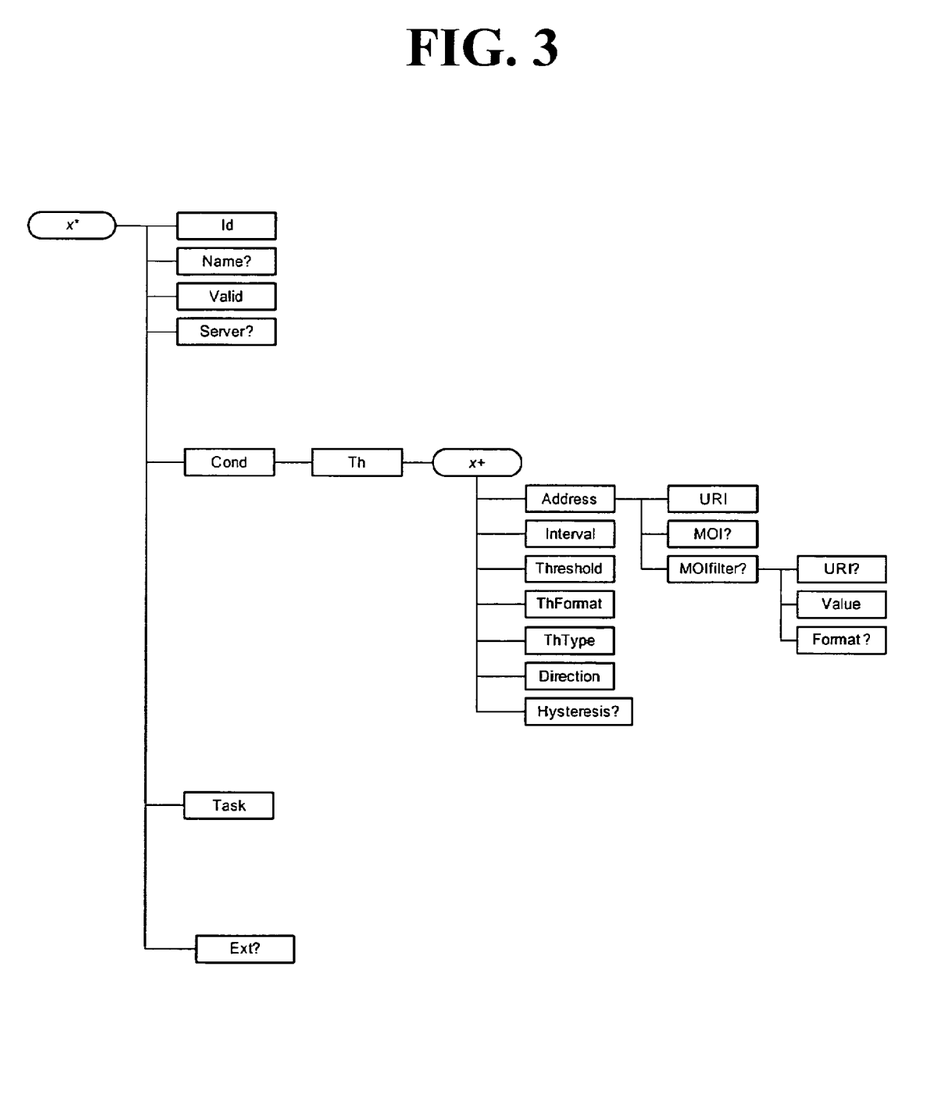
FIG. 3 shows the scheduling context as an another exemplary device management tree structure according to the present invention.

With the explanation of FIG. 1, FIGS. 2 and 3 will also be explained.

FIG. 1 shows an exemplary DM server (100) and a terminal (100) according to the present invention.

(1) Features of the DM Server

The DM server (100) may include a DM scheduling enabler (110) or other similar hardware, software, or any combination thereof.

The DM scheduling enabler (110) may be comprised of a scheduling context management module (111) and a status reporting processing module (112) and/or other types of similar hardware, software, or any combination thereof.

The scheduling context management module (111) may have a unit (i.e., portion, element, etc. or a combination thereof) that generates a scheduling to context and requests the terminal (200) to install and execute it.

In more detail, the scheduling context management module (111) establishes a device management (DM) session (or some other type of communication term or period) with the terminal (200) according to a relative standard (such as DM standard) and then can request the terminal (200) to install is the scheduling context via the established DM session.

The scheduling context may include general information and one or more scheduling components as illustrated in FIG. 2. Additional and/or alternative types of information, parameters, and the like may also be included. Here, the general information may include one or more of the following: an identifier element of the scheduling context, a name element, a corresponding server element, and a validity period element. The scheduling component may include one or more of the following: a Task element that designates a DM command, and a Condition element that designates a condition(s) (i.e., reasons, factors, parameters, etc.) for executing the DM command. However, it should be noted that the elements are not limited to only those listed above, but different additional elements or only some of the listed elements may be used.

Here the command for the device management may be included in a message. In other words, the message may include at least one or more commands for device management. If the message is used, the task element designates the message. And, the conditions above may be timer-based, trap-based, or threshold-based. Additional or alternative basis for the conditions may be used as well.

Meanwhile, one or more scheduling components may exist within the scheduling context, and these scheduling components may have a binding logical relationship therebetween. Namely, the scheduling components may be interworked. For example, this interworking may refer to when a module (or other entity) executes a command of a first schedule component if a condition of a first schedule is satisfied, and terminates a command of a second schedule component. This is particularly useful for threshold-based scheduling, whereby one or more components can be respectively executed in an alternating manner based upon a particular threshold value.

This concept of the interworking may be applied to the scheduling context. That is, if a first scheduling context of at least one or more scheduling context is started, a second scheduling context of the at least one or more scheduling context is stopped.

The scheduling context may be revised (i.e., corrected, adapted, modified, etc.) by the scheduling context management module (111) as necessary, or such revision may be requested to the terminal (200). Also, the scheduling context management module (111) may request the terminal (200) to delete the installed scheduling context.

Additionally, when the scheduling context installed or re-installed in the terminal (200) changes or when an error occurs or if the scheduling context state changes, the scheduling context management module (111) may receive a message (or other indication) from the terminal (200) and perform appropriate processing thereof.

Above, it has been described the task element, and the Condition element are included in the schedule component. But, it is noted that these elements may be directly included in the scheduling context, as illustrated in FIG. 3.

(2) Features of the Terminal

The terminal (200) may comprise a DM scheduling enabler (210) and a DM enabler (220). Here, it can be understood that other similar hardware, software, or any combination thereof may also be used.

The DM scheduling enabler (210) may be comprised of a scheduling context installation module (211), a condition matching module (212), a DM command executing module (213), and a status reporting module (214). Here, it can be understood that other similar hardware, software, or any combination thereof may also be used.

The scheduling context installation module (211) is a unit (i.e., portion, element, etc. or a combination thereof) that may receive a scheduling context installation request from the server (110) (i.e., the DM scheduling enabler (110)) and perform appropriate processing thereof. Here, the scheduling context may be received trough the DM enabler (220), then may be delivered to the scheduling context installation module (211). The scheduling context installation module (211) uses the scheduling context to generate one or more nodes (or other types of hierarchy points) in a device management (DM) tree (or other type of hierarchy structure or logical format) that is used within the terminal (200). Here, the DM tree may be formed of general information nodes and one or more schedule components (scheduled device management).

Referring to FIG. 2, the DM tree (i.e., a scheduling context installation format) will be explained in more detail.

An exemplary DM tree is shown in FIG. 2. In more detail, the general information nodes (as shown in FIG. 2) may be comprised of an Id node indicating an identifier of the installed scheduling context, an Name node indicating a name of the scheduling context, an Valid node indicating a valid period of the scheduling context, and an Server node indicating the owner of the scheduling context. It can be clearly understood that the names and types of these nodes are merely exemplary.

The schedule component may be comprised of one or more of the following: an Task node that indicates a DM command, and an Condition node that designates a condition (or circumstance) for performing the DM command. Clearly, other types of additional or alternative nodes are possible.

Here, the DM command is included in a message. Accordingly, the Task node may designate the message including the DM command. And, as above described, the condition may be threshold-based. Therefore, the Condition node includes a Th node that specifies a threshold-based condition.

The Th node, as illustrated in FIG. 2, includes at least one of a Address node to specify an address of the management object, an Interval node to specify an interval for monitoring the value for the management object, a Threshold node to specify the threshold, a ThFormat node to specify which a format of the threshold is of bool, character, integer, float, date, or time, a ThType node to specify whether a type of the threshold is absolute value or delta value, a Direction node to specify which the threshold is of rising, failing and static, and a Hysteresis node to specify a margin for the threshold.

Also, the Address node includes at least one of a URI node to specify an uniform resource identifier (URI) of the management object, a MOI node to specify a the management object identifier (MOI), and a MOIfilter node to specify an additional information for distinguishing the specified management object from other management objects due to a coexistence of management objects with same MOI if the MOI node is used.

The URI node may specify a full address, if the MOI node is not present. However, if the MOI node is present, then the URI node may specify a relative address to the root of the management object.

In particular, the MOlfilter node includes at least one of a URI node, a Value node, and a Format node.

The URI node included in the MOlfilter node specifies a uniform resource identifier (URI) of the specified management object, relative to the root of the management object.

The Value node included in the MOlfilter node specifies a value to be compared with a value of the specified management object indicated by the URI node of the MOlfilter node, in order to distinguish the specified management object from other management objects in case there are more than one management object with the same management object identifier (MOI). The value in the Value node can be compared with the value of the URI, if the URI node included in the MOlfilter node is present. However, if the URI node included in the MOlfilter node is not present, then the value in Value node can be compared with the root name of the management object.

The Format node included in the MOlfilter node specifies a format of the value in the Value node. The possible values are b64, bin, bool, int, xml, date, time, or float. If the Format node is not present, then the format of the Value node would be considered as character.

Meanwhile, the Threshold node specifies the threshold, and a value of the Threshold node is the numeric text string representing the various formats of the threshold value. The actual format of the threshold is determined by the ThFormat node. The sample statistics of the selected management object will be compared with the value of the Threshold node. But, if the currently sampled value is the first one (e.g. after power recycles, the Scheduling Operation is just started), and if there is no previous sample, the last sample is not taken into account. When this threshold is the rising-threshold, a single condition match occurs if the currently sampled value is greater than or equal to this threshold, and if the last sample was less than this threshold. When this threshold is the falling-threshold, condition match occurs in the opposite direction. When this threshold is set to the static-threshold, a single condition match event occurs when the current sample value is equal to this threshold irrespective of the crossing, and if the last sample was not equal to this threshold. But the logical status of the condition will be true as long as the sampled value is equal to this threshold. If the hysteresis is specified, after a threshold crossing event is generated, another one will not be generated until the sampled value falls below or rises above this threshold by the margin specified by the hysteresis.

The ThFormat node specifies the real format of the threshold and the hysteresis. Possible values of the ThFormat node are, bool, chr, int, date, time, or float.

The ThType node specifies the threshold type. Possible values of the ThType node are absolute or delta. If the value is Absolute, the sampled value of the management object will be compared directly with the threshold. If the value is Delta, the sampled value at the last sampling will be subtracted from the currently sampled value, and the difference will be compared with the threshold.

The Direction node specifies the behavior of the value changes as the threshold crossing event occurs. Possible values are rising, falling or static. The static-threshold means that the condition match occurs when the sampled value is equal to the threshold irrespective of the direction of the crossing.

The Hysteresis node specifies a value of the hysteresis. The value of the Hysteresis node is the text string representing the various formats of the hysteresis value. The real format of the hysteresis value is determined by the ThFormat node. Using hysteresis prevents too many threshold crossing events from being generated if the sample valued fluctuates around the threshold due to noise. For example, in case of rising-threshold, once the command is executed, it will not be executed again, unless the sampled value becomes less than the threshold by the margin specified by this node.

Meanwhile, it is above described the Task node, and the Condition node are included in the schedule component. But, it is noted that these elements may be directly included in the scheduling context, as illustrated in FIG. 3.

Before the scheduling context is installed due to instructions from the DM server (100), the scheduling context installation module (211) may selectively check the validity (or authenticity) of the scheduling context, if necessary.

The condition matching module (212) is a unit (i.e., portion, element, etc. or a combination thereof) that monitors or checks whether there is a matching of threshold-based conditions in the schedule component for execution. The Threshold-based condition designates whether a value of a particular management object within the terminal (200) reaches a previously set threshold value. Accordingly, the condition matching module (212) monitors (or checks) the value of the particular management object, compares such with the threshold value, and when the threshold value is reached, then a request to the DM command executing module (213) to execute the DM command corresponding to the condition can be made.

In the condition matching module (212) that performs the above procedure, one or more schedule components (i.e., a device management function or procedure that has been scheduled) exist, and if each respective schedule component contains conditions for executing the threshold-based procedure with respect to the same particular management entity, the conditions for executing the threshold-based procedure can be interworked with respect to the particular management entity and can also be monitored.

For example, let us assume that a first schedule component (i.e., device management that has been scheduled) and a second schedule component (i.e., device management that has been scheduled) respectively exist within the scheduling context. Also, let us assume that the first schedule component includes a first DM command and conditions for executing a first threshold-based procedure with respect to a particular management entity, and the second schedule component includes a second DM command and conditions for executing a second threshold-based procedure with respect to the same particular management entity. If so, when the value of the particular management entity satisfies the conditions for executing the first threshold-based procedure, the condition matching module (212) requests to the DM command executing module (213) to execute the first DM command. Also, when the value of the particular management entity satisfies the conditions for executing the second threshold-based procedure, the condition matching module (212) requests to the DM command executing module (213) to execute the second DM command.

The DM command executing module (213) is a unit (i.e., portion, element, etc. or a combination thereof) that cooperates with the DM enabler (220) to execute the DM command if there is a matching of the conditions or executing the DM command. In other words, the DM command executing module (213) sends the DM command to the DM enabler (220), and receives a result obtained by executing the DM command from the DM enabler (220).

The status reporting module (214) is a unit that reports to the DM server (100) about the state of the terminal (22) or about results obtained from executing the command. The status reporting module (214) uses the DM command execution results (i.e., a Status message, a Result message, or an Alert message) to generate a report message, which can be sent to the DM server (100). Here, the report message or the state of the terminal (200) can be transmitted to the DM server (100) by using a Generic Alert Message or by some other type of message or indication. Also, as explained above, the status reporting module (214) may report to the DM server (100) when the state of the scheduling context or the state of the scheduling component changes.

The DM enabler client (220) is a unit that cooperates with the command execution module (214) to execute the DM commands. In more detail, the DM enabler client (220) executes a DM command received from the command execution module (214), and then the results thereof is returned back (i.e. reported) to the command execution module (214).

Thus far, the constituting elements of the present invention DM system has been described with respect to a DM server (100) having a scheduling context management module (111) and a status reporting processing module (112), and a terminal (200) having a DM scheduling enabler (210) (containing a scheduling context installation module (211), a condition matching module (212), a DM command executing module (213), and a status reporting module (214)), and a DM enabler (220). However, these elements may also be implemented as any combination of a processor (not shown), a network interface (not shown), and a storage device (not shown).

Features of the Method According to the Present Invention

The operation of the DM system of the present invention will be explained in more detail with reference to FIGS. 4 and 5. It should be noted that although FIGS. 4 and 5 do not depict the details of all elements, each procedure may be performed by various elements within the DM server (100) and the terminal (200) described previously.

Figure 4:
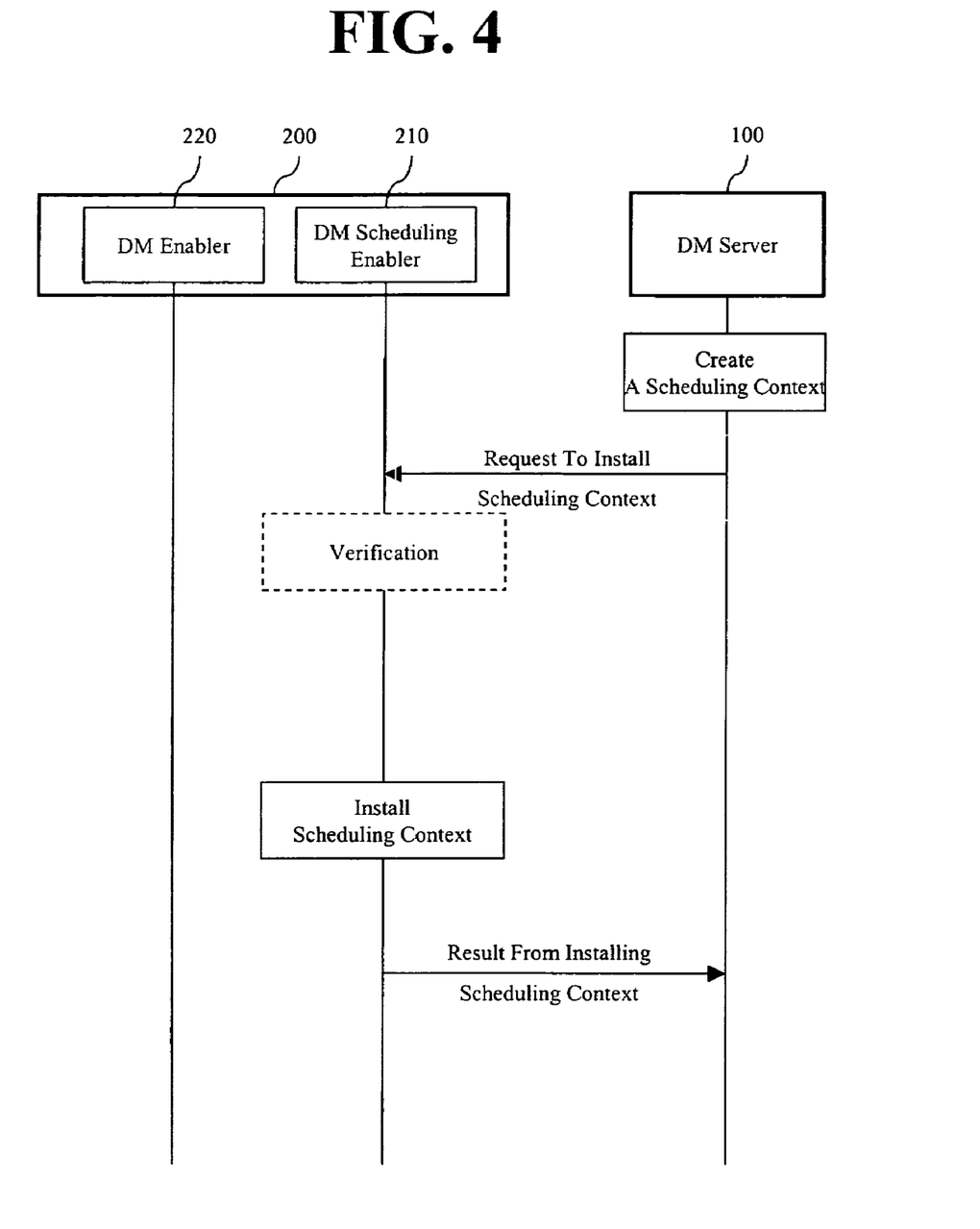
FIG. 4 shows an exemplary flow chart of a scheduling context installation procedure according to the present invention.
Figure 5:
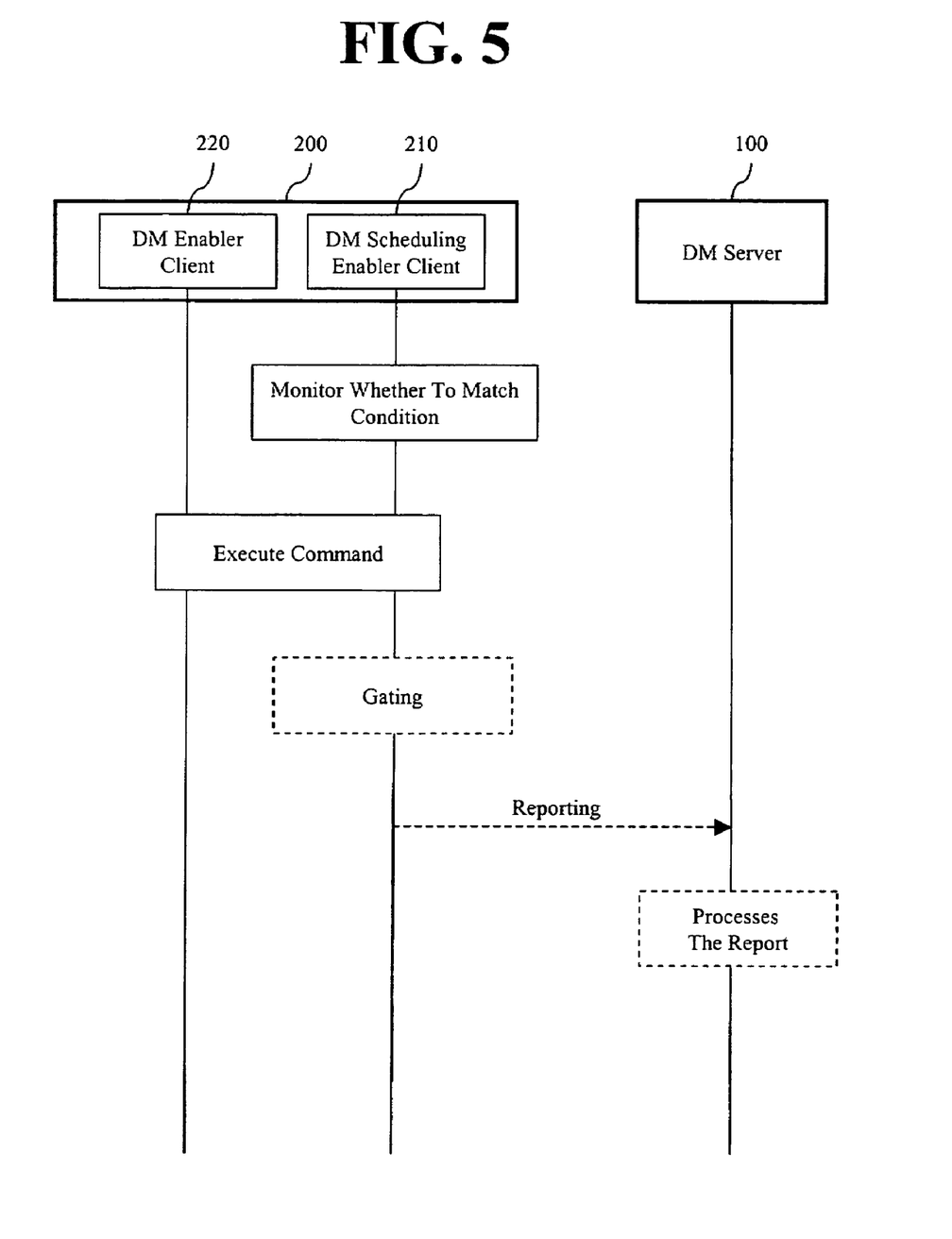
FIG. 5 shows a flow chart for an exemplary method for performing device management scheduling according to the present invention.

FIG. 4 is a flow chart showing a scheduling context installing procedure according to the present invention, and FIG. 5 is a flow chart showing a method for performing a scheduled device management according to the present invention.

As shown in FIG. 4, in the installing procedure of the present invention, the DM server (100) establishes a DM session (or some other type of communication link) with the DM enabler (220), and the scheduling context is installed.

An exemplary scheduling context installing procedure of the present invention will be explained in more detail as follows.

1) The DM server (100) (in particular, the scheduling context management module (111) thereof) generates (or creates) a scheduling context.

2) The DM server (100) establishes a DM session with the terminal (200), and uses the DM protocol (or other appropriate communications protocol) to deliver a request (or instruction) to install the generated scheduling context to the DM scheduling enabler client (210) of the terminal (200). Here, the request can be delivered through the DM enabler (220) to the DM scheduling enabler client (210).

3) The DM scheduling enabler (210) of the terminal (200) (in particular, the scheduling context installation module (211) thereof) checks the validity of the scheduling context.

4) Upon completion of the validity check, the DM scheduling enabler (210) of the terminal (200) (in particular, the scheduling context installation module (211) thereof) installs the scheduling context in the DM tree (or other type of hierarchy is structure or logical format) of the terminal (200). Here, an example of the DM tree is shown in FIGS. 2 and 3 as described above.

5) When such installation is completed, the DM scheduling enabler (210) of the terminal (200) (in particular, the scheduling context installation module (211) thereof) reports the results of the scheduling context installation to the DM server (100).

Referring to FIG. 5, an exemplary schedule component processing method of the present invention will be described.

1) The DM scheduling enabler (210) (in particular, the condition matching module (212) thereof) checks the Condition node in the DM tree that represents a scheduling context installation, and monitors whether there is a match with the conditions for execution thereof. Here, such conditions may be Threshold-based. Other additional or alternative conditions are also possible.

2) In accordance with such monitoring, if it is confirmed that there is a match of the condition for execution, the DM scheduling enabler (210) (in particular, the DM command executing module (213) thereof) cooperates with the DM enabler (220), to thus execute the DM command.

3) When the execution of the DM command is completed, the DM scheduling enabler (210) (in particular, the status reporting module (214) thereof) reports the execution results or the state of the terminal (200) to the DM server (100). Namely, the report of the execution results may inform the DM server (100) about whether the DM command was properly performed, or the reason(s) why an error has occurred. Such reporting procedure may use the execution results to create a report message (or some other type of indication), which may then be sent to the DM server (100).

4) receiving the status report, the DM server (100) (in particular, the status reporting processing module (120) thereof) performs parsing (or other processing) on the received status report.

Figure 6:
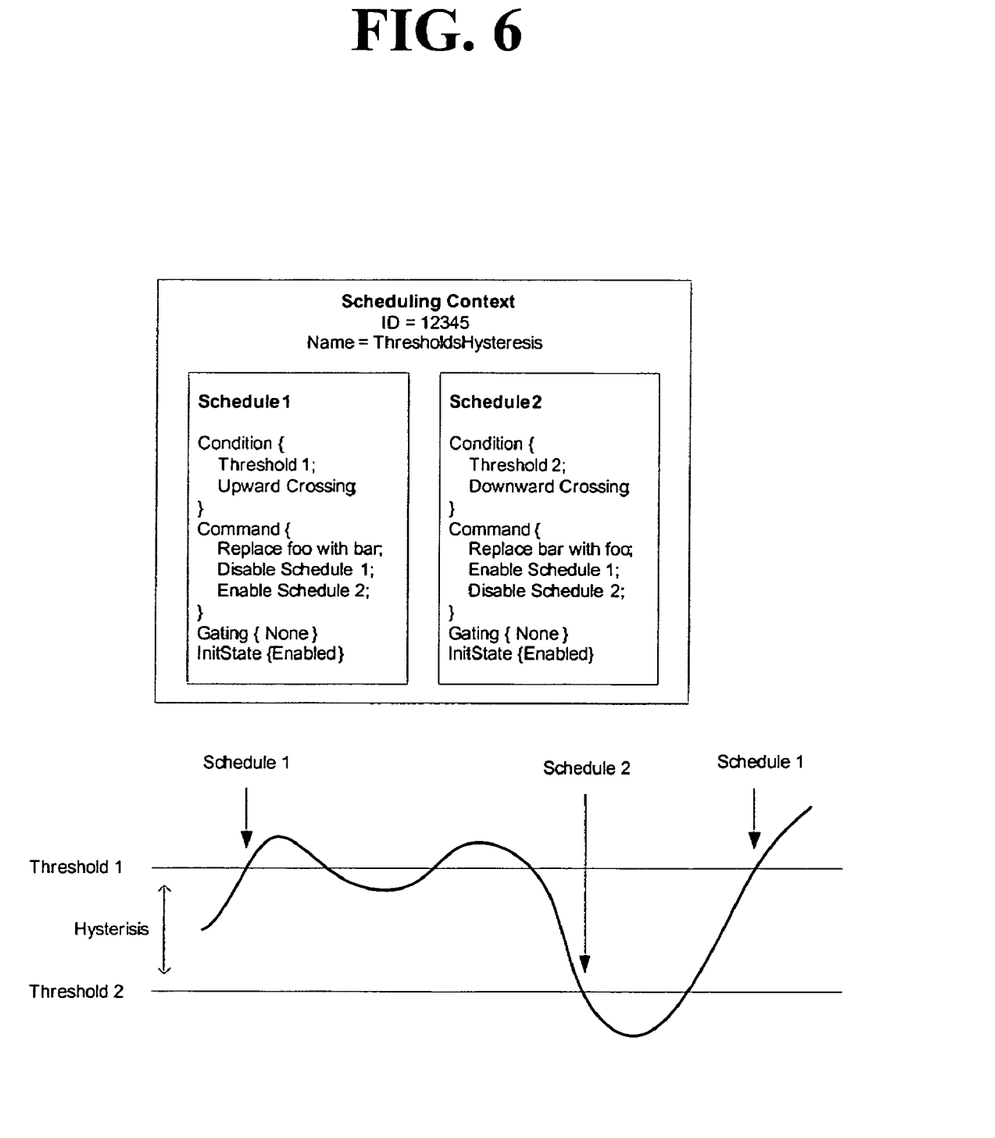
FIG. 6 shows an exemplary method for performing a threshold-based device management scheduling procedure.
Figure 7:
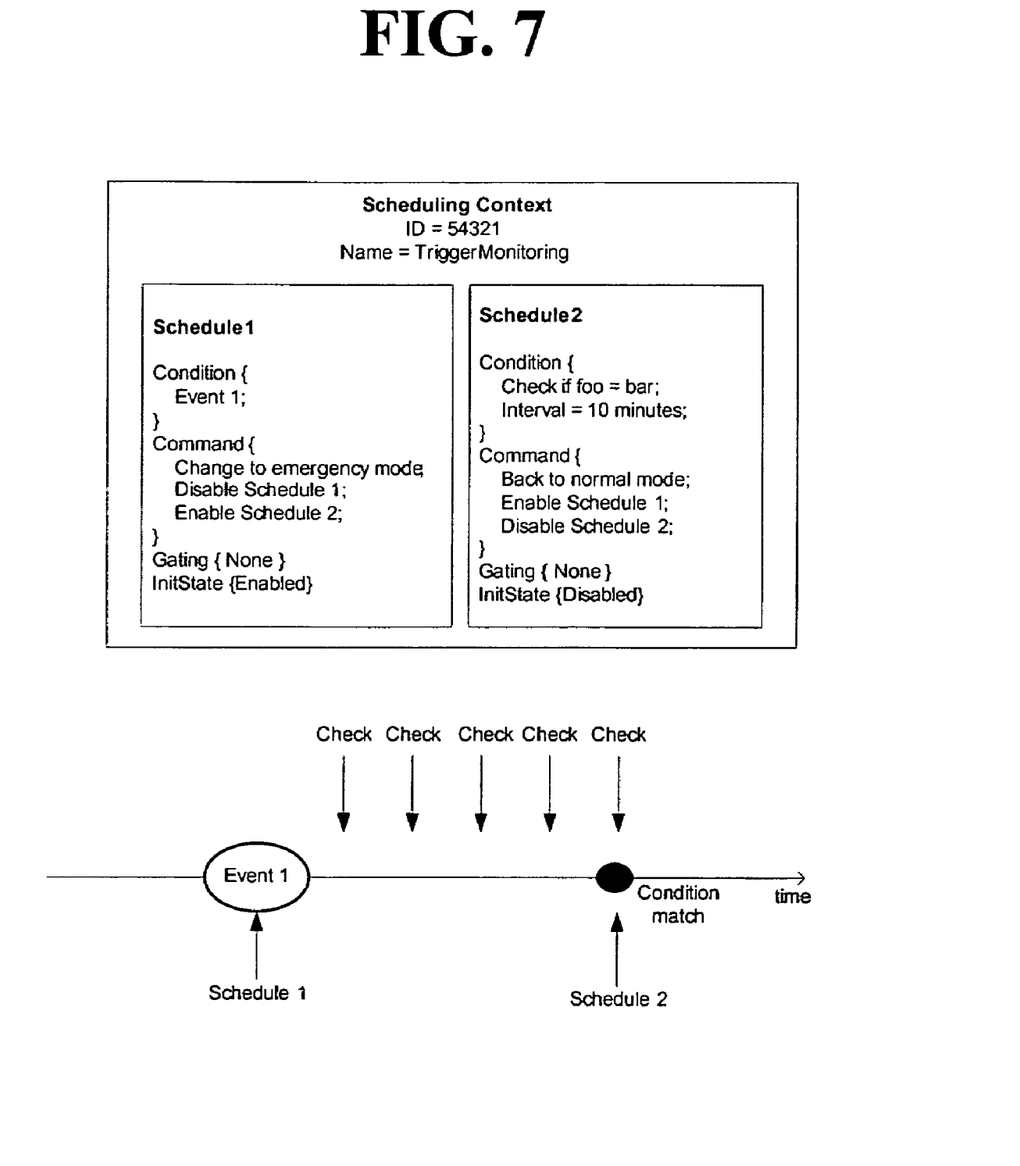
FIG. 7 shows another exemplary method for performing a trap-based device management scheduling procedure.

FIG. 6 shows an exemplary method for performing threshold-based device management scheduling, while FIG. 7 shows an exemplary method for performing trap-based device management scheduling.

As shown in FIG. 6, the scheduling context may be comprised of two schedule components. In more detail, the first schedule component (i.e., scheduled device management) of the scheduling context allows execution of a DM command that changes the variable foo to bar, if the value of a particular management entity, for example, if the threshold value when a radio interface entity having a stable throughput, exceeds 1. Also, the second schedule component of the scheduling context allows execution of a DM command that changes the variable bar to foo, if the value of a particular management entity goes back to a stable state. Also, due to hysteresis, the first and second schedule components may ignore the situations where the throughput of a particular radio interface exceeds threshold 1 but then again falls below threshold 1, if such difference is considered to be relatively small (i.e., if within the hysteresis (allowed) range). This is to exclude the causes for system instability due to the effects of noise (or other interference).

An exemplary execution procedure of the first and second components will be described.

(1) The first component and the second component change from an initial state to an active (or enabled) and are executed.

(2) If the throughput of a particular radio (wireless) interface device exceeds threshold 1, the DM command of the first schedule component is executed.

(3) Upon executing the DM command, the variable foo changes to bar, the first schedule component becomes inactive (or disabled), and the second schedule component is executed.

(4) If the throughput of a particular radio (wireless) interface device falls below threshold 2, the DM command of the second schedule component is executed.

(5) Upon executing the DM command, the variable bar changes to foo, the second schedule component becomes inactive (or disabled), and the first schedule component is executed.

FIG. 7 shows a scheduling context that comprises two schedule components (i.e., scheduled device management). In more detail, the first schedule component of the scheduling context allows the terminal operation mode to be set to emergency mode when a particular event 1 occurs, and executes a second schedule component. The second schedule component of the scheduling context periodically checks whether there is an abnormal state, and if the abnormal state is removed (or resolved), the terminal is allowed to return to its normal mode from the emergency mode.

An Exemplary Execution Procedure of the First and Second Schedule Component is as Follows.

(1) When the scheduling context is installed, the second component changes from its initial state to an inactive (or disable) state, the first schedule component changes from its initial state to an active or enabled state and is executed.

(2) When the particular event 1 occurs, the DM command of the first schedule component is executed.

(3) Upon execution of the DM command, the terminal operation mode changes to emergency mode, the first schedule component becomes inactive (or disabled), and the second schedule component becomes active (or enabled).

(4) When the second schedule component changes to active state and is executed, the second schedule component checks whether the state of the terminal is normal, whereby this checking is performed in a periodic manner, such as every 10 minutes.

(5) Upon this periodic checking, if the state of the terminal is found to be normal, the DM command of the second component is executed.

(6) When the DM command executed, the terminal operation mode changes from emergency mode to normal mode, the second schedule component is disabled, and the first schedule component is enabled.

The method of the present invention may be implemented as software, hardware, or any combination thereof. For example, the method of the present invention may be implemented as codes or instructions within a software program that is stored in a storage medium (e.g., an internal memory of the terminal, a Flash memory, a hard disk, etc.) and executed by a processor (e.g., a microprocessor within the terminal, etc.).

As for the effects of the present invention, by providing (ahead of time), to the terminal, DM commands to be executed within the terminal and threshold-based conditions (included within the scheduling context) for executing such DM commands, and having the terminal execute these DM commands according to the threshold-based conditions, the result would be that the terminal recognizes such commands as if they are being immediately provided from the DM server, whenever the terminal requests a DM command(s) from the DM server.

Also, as the present invention allows DM commands to be executed according to a particular threshold value, errors that may occur in the terminal may be effectively prevented (or at least minimized).

Additionally, by allowing the one or more scheduling contexts to be respectively executed in an alternating manner based upon a particular threshold value, the DM commands may be executed a more systematic manner and thus handled more effectively.

It should be noted that the features and concepts of the present invention are related to various types of standards with respect to device management (DM) that are governed by certain corresponding standards organizations. As such, various corresponding standards and the concepts specified therein are also part of the present invention.

Although this specification specifies various names of commands, nodes, sub-nodes, etc. related to device management (DM), it can be clearly understood that such names and labels are merely exemplary. The features of the present invention are not meant to be so limiting, as other equivalent names or labels may be used, as long as they refer to the same or equivalent functions and/or features.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device management method in a mobile terminal, comprising:
    receiving a schedule, from a server via a device management session using device management protocols;
    installing the schedule in a form of a management object, the schedule including a task for device management and a condition for task execution, the condition including at least one of a first element and a second element, the first element specifying an address of a management object and the second element specifying a threshold;
    after a particular event occurs, sampling a value of the management object;
    comparing the sampled value with the threshold; and
    executing the task without connecting to the server if the sampled value has reached the threshold,
    wherein the condition further includes plural first and second elements, each first element specifying an address of a corresponding management object having a corresponding value and each second element specifying a corresponding threshold,
    wherein the step of sampling further comprises sampling a value of each of the corresponding management object, and wherein the step of comparing further comprises comparing each sampled value with the corresponding threshold.

2. The method of claim 1, wherein the step of sampling comprises:
comparing the sampled value with a previously sampled value.

3. The method of claim 2, further comprising:
ignoring the previously sampled value if the previously sampled value corresponds to a sample value before rebooting.

4. The method of claim 1, wherein the step of executing the task comprises:
after the particular event occurs, executing the task if the sampled value is equal to or greater than the threshold and if a previously sampled value is less than the threshold.

5. The method of claim 1, wherein the step of executing the task comprises:
after the particular event occurs, executing the task if the sampled value is equal to or less than the threshold and if a previously sampled value is greater than the threshold.

6. The method of claim 1, further comprising:
if the task was previously executed, delaying the step of executing the task until the sampled value falls below the threshold or rises above the threshold by a specified margin.

7. The method of claim 1, wherein the step of executing the task comprises:
after the particular event occurs, executing the task if the sampled value is equal to the threshold and if a previously sampled value is not equal to the threshold.

8. The method of claim 1, wherein the step of comparing comprises:
if the threshold is a delta value, comparing a difference between the sampled value and a previously sampled value with the threshold.

9. The method of claim 1, wherein
the first element corresponds to a uniform resource identifier (URI), and
the second element corresponds to a threshold element.

10. A mobile terminal, comprising:
a Device Management (DM) Scheduler configured to
receive a schedule from a server via a device management session using device management protocols;
install the schedule in a form of a management object, the schedule including a task for device management and a condition for task execution, the condition including at least one of a first element and a second element, the first element specifying an address of a management object and the second element specifying a threshold;
after a particular event occurs, sample a value of the management object;
compare the sampled value with the threshold; and
execute the task without connecting to the server if the sampled value has reached the threshold,
wherein the condition further includes plural first and second elements, each first element specifying an address of a corresponding management object having a corresponding value and each second element specifying a corresponding threshold, and
wherein the DM Scheduler is further configured to sample a value of each of the corresponding management objects, and to compare each sampled value with the corresponding threshold.

* * * * *